US011456466B2

United States Patent
Duckworth et al.

(10) Patent No.: US 11,456,466 B2
(45) Date of Patent: *Sep. 27, 2022

(54) PLASTIC FRAME ASSEMBLY AND BIPOLAR PLATE WITH THROUGH-FLOW FUEL FEED

(71) Applicant: Intelligent Energy Limited, Loughborough (GB)

(72) Inventors: Lee Duckworth, Loughborough (GB); Jonathan Cole, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 91 days.

This patent is subject to a terminal disclaimer.

(21) Appl. No.: 16/637,684

(22) PCT Filed: Aug. 2, 2018

(86) PCT No.: PCT/GB2018/052217
§ 371 (c)(1),
(2) Date: Feb. 7, 2020

(87) PCT Pub. No.: WO2019/030504
PCT Pub. Date: Feb. 14, 2019

(65) Prior Publication Data
US 2020/0203737 A1 Jun. 25, 2020

(30) Foreign Application Priority Data
Aug. 11, 2017 (GB) .................... 1712955

(51) Int. Cl.
*H01M 8/0258* (2016.01)
*H01M 8/2483* (2016.01)
(Continued)

(52) U.S. Cl.
CPC ....... *H01M 8/0258* (2013.01); *H01M 8/0267* (2013.01); *H01M 8/0273* (2013.01); *H01M 8/2483* (2016.02)

(58) Field of Classification Search
CPC ............ H01M 8/0223; H01M 8/0254; H01M 8/0258; H01M 8/0267; H01M 8/0271;
(Continued)

(56) References Cited

U.S. PATENT DOCUMENTS

| 6,395,416 | B1 | 5/2002 | Tanemoto et al. |
| 2005/0136317 | A1 | 6/2005 | Ferguson |

FOREIGN PATENT DOCUMENTS

| EP | 1020941 | * | 7/2000 |
| GB | 2500383 | * | 9/2013 |

(Continued)

OTHER PUBLICATIONS

2K Injection Molding, GL Plastics, https://gl-plastics.nl/en/manufacturing/2k-injection-molding/, 2021.*
(Continued)

*Primary Examiner* — Brittany L Raymond
(74) *Attorney, Agent, or Firm* — Baker Hostetler LLP; Mark H. Krietzman

(57) ABSTRACT

The present disclosure provides methods for forming flow plate and frame assemblies that comprise an anode frame member, a flow plate, and a cathode frame member with the flow plate retained between the anode and cathode frame members. The present disclosure also provides for flow plate and frame assemblies, fuel cell stacks containing a plurality of the flow plate and frame assemblies, and fuel cell systems containing the fuel cell stacks. A fluidly connected anode fluid pathway can be provided from an anode fluid inlet, through conduits in the anode frame member, onto an anode surface of the flow plate, and into anode flow channels.

13 Claims, 15 Drawing Sheets

(51) Int. Cl.
*H01M 8/0267* (2016.01)
*H01M 8/0273* (2016.01)

(58) Field of Classification Search
CPC ............. H01M 8/0273; H01M 8/2483; H01M 2008/1095; Y02E 60/50
See application file for complete search history.

(56) References Cited

FOREIGN PATENT DOCUMENTS

| | | |
|---|---|---|
| GB | 2509318 | 7/2014 |
| JP | 2000-208154 A | 7/2000 |
| WO | 2008024400 | 2/2008 |

OTHER PUBLICATIONS

International Search Report dated Oct. 17, 2018 in PCT application No. PCT/GB2018/052217.
International Written Opinion dated Oct. 17, 2018 in PCT application No. PCT/GB2018/052217.
International Patent Application No. PCT/GB2018/052217; Int'l Preliminary Report on Patentability; dated Feb. 20, 2020; 8 pages.

* cited by examiner

PLASTIC FRAME ASSEMBLY AND BIPOLAR PLATE WITH THROUGH-FLOW FUEL FEED

CROSS-REFERENCE TO RELATED APPLICATIONS

This application is a 371 National Stage Application of International Patent Application No. PCT/GB2018/052217 filed Aug. 2, 2018, which claims priority from GB Patent Application No. 1712955.2 filed Aug. 11, 2017, the entire contents of which are incorporated by reference herein.

FIELD OF THE DISCLOSURE

This disclosure is in the field electrochemical fuel cells. In particular, the disclosure relates to devices and methods for use in electrochemical fuel cell assemblies, including a framing system for fluid flow plates allowing for multiple fluid flow channels and arrangements thereof.

BACKGROUND

A fuel cell stack assembly can be formed from a series of fluid flow plates alternated with membrane electrode assembly layers. In an evaporatively cooled (EC) proton exchange membrane (PEM) fuel cell, water can be introduced via anode fluid flow paths or cathode fluid flow paths into the fuel cell stack to hydrate the membrane and to cool the cells. EC cells can provide good mass and volumetric power density because of a simple single plate arrangement and reduced cell pitch when compared to liquid-cooled fuel cells with intervening sealed liquid cooling passageways. In a typical EC fuel cell arrangement, the cooling water is injected into the anode or cathode fluid flow channels from one or more common manifolds extending down the side of the fuel cell stack. EC fuel cell stacks impart a pressure drop on the cathode and anode fluids to a similar level as that through the active area, which creates a dependency on the consistency of the cell periphery manifolds and resultant pressure drops for cell-to-cell performance consistency. Using continuous seals made from gasketing material like rubber around fluid flow plates to provide for alignment and fluid flow manifolding can lead to misalignments at various points throughout a fuel cell stack assembly having a plurality of fluid flow plates loaded under high compression force. Such continuous sealing must also be applied as a secondary manufacturing step after the formation of the fluid flow plate, which can create supply chain issues and increase manufacturing costs or lead times.

Some problems to be addressed in fuel cell assemblies include: ensuring a uniform flow field for fluid distribution in fuel, oxidant, and coolant lines; minimizing the pressure drop across inlet manifolds; minimizing the sealing pressure required to ensure gas-tight operation; making the construction of a fluid flow plate compatible with mechanized assembly processes, given the large number of units that need to be assembled with precision in manufacturing a fuel cell assembly; reducing the pitch of the fuel cells making up a stack while maintaining operation within desired parameters; reducing the number of components; reducing the overall weight; reducing material usage and wastage; simplifying the design, manufacture and assembly; and in general reducing the overall cost of a fuel cell assembly.

Thus, there is a need for components that allow for simplified manufacturing and assembly while providing for precise alignment of fluid flow manifolds and distribution pathways. The disclosure is directed to these and other important needs.

DISCLOSURE

The present disclosure provides aspects of flow plate and frame assemblies comprising an anode frame member comprising an outer surface, an inner surface, and an anode frame opening, a cathode frame member comprising an outer surface, an inner surface, and a cathode frame opening, and a flow plate comprising an anode surface and a cathode surface. In some implementations, the cathode frame member and anode frame member engage with each other along their respective inner surfaces, and retain and surround the flow plate in between the inner surfaces with a portion of the anode surface in contact with the anode frame member inner surface and a portion of the cathode surface in contact with the cathode frame member inner surface. In further implementations the anode frame member, the cathode frame member, or both can comprise two distinct materials. In yet further implementations the two distinct materials comprise a rigid frame element made from a hard plastic material and select regions of a compressible sealing material. In certain implementations the anode frame member, cathode frame member, or both are formed via a 2K molding process. In some implementations, the anode surface can have a plurality of anode flow channels and the cathode surface can have a plurality of cathode flow channels The present disclosure provides fuel cell stack assemblies comprising a plurality of identical flow plate and frame assemblies of the disclosure, with each identical flow plate and frame assembly aligned with the outer surfaces of adjacent flow plate and frame assemblies engaging together.

The present disclosure provides fuel cell systems comprising the fuel cell stack assemblies disclosed herein. In some implementations, the fuel cell systems can have an anode fluid supply containing anode fluid and fluidly connected to the anode fluid entry conduits of the fuel cell stack, a cathode fluid supply containing cathode fluid and fluidly connected to the cathode fluid entry conduits of the fuel cell stack, and a coolant fluid supply containing coolant fluid and fluidly connected to the coolant fluid entry conduits of the fuel cell stack.

The present disclosure provides methods of assembling a flow plate and frame assembly comprising forming an anode frame member having an outer surface, an inner surface, and an anode frame opening, forming a cathode frame member having an outer surface, an inner surface, and a cathode frame opening, forming a flow plate having an anode surface having a plurality of anode flow channels and a cathode surface having a plurality of cathode flow channels, disposing the flow plate onto the cathode frame member with the cathode surface in contact with the inner surface, and disposing the anode frame member onto the flow plate and cathode frame member with the inner surface in contact with the inner surface and anode surface. In some implementations the anode frame member, the cathode frame member, or both can be formed from two distinct materials. In further implementations, the two distinct materials can be a rigid frame element made from a hard plastic material and select regions of a compressible sealing material. In certain implementations the anode frame member, cathode frame member, or both are formed via a 2K molding process. In further implementations, the methods of assembling a flow plate and frame assembly can include a step of aligning the fluid inlets and outlets of the anode frame member and cathode frame member.

The present disclosure provides methods of assembling an aligned fuel cell stack assembly including the steps of obtaining a plurality of identical flow plate and frame assemblies, stacking the plurality of identical flow plate and frame assemblies together into a stack with the outer surfaces of adjacent flow plate and frame assemblies engaging together to form seals.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale. In the drawings.

In the figures, like reference numerals designate corresponding parts throughout the different views. All descriptions and callouts in the Figures are hereby incorporated by this reference as if fully set forth herein.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about," it will be understood that the particular value forms another exemplar. All ranges are inclusive and combinable.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any sub-combination. Further, reference to values stated in ranges include each and every value within that range.

Figure 1:
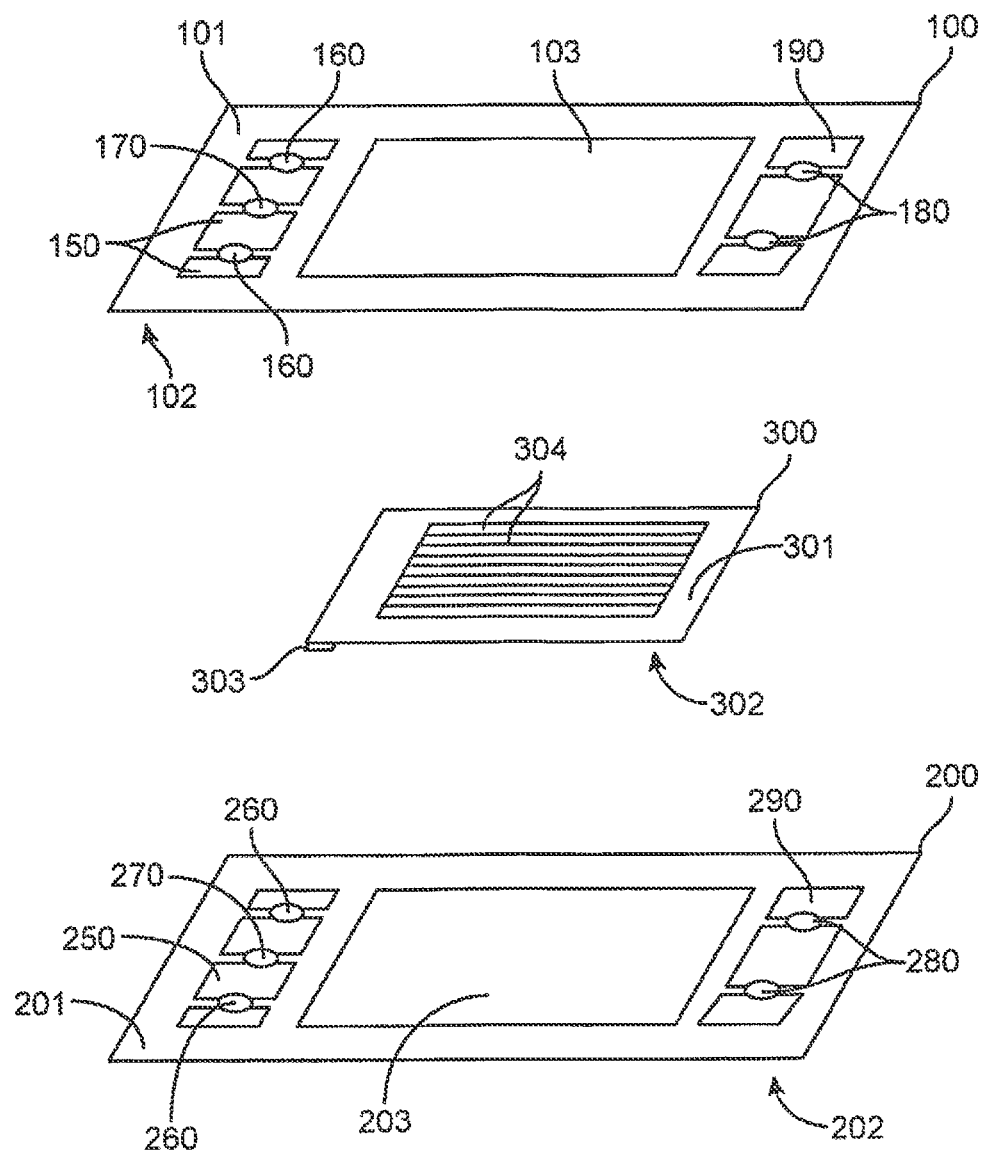
FIG. 1 illustrates aspects of an exemplary flow plate and frame assembly shown in an exploded assembly perspective view.
Figure 2:
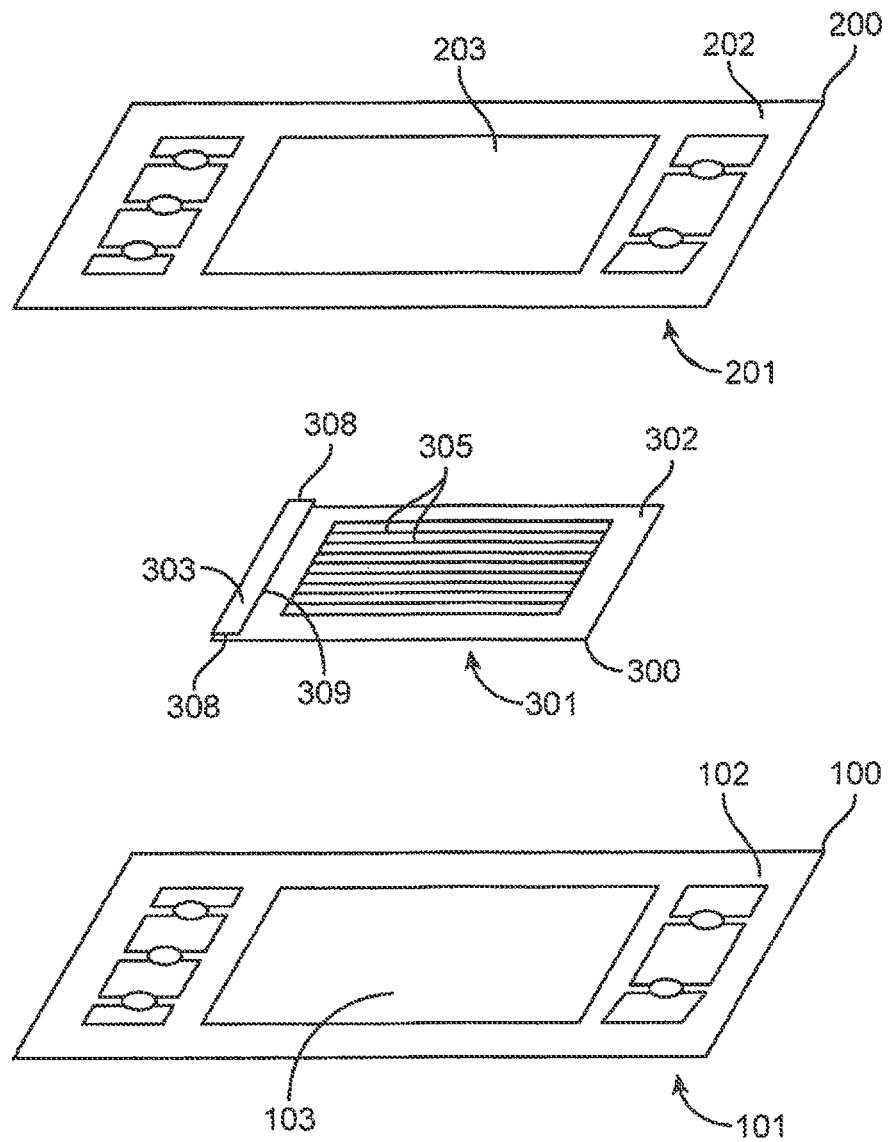
FIG. 2 illustrates aspects of the exemplary flow plate and frame assembly shown in FIG. 1 in an exploded assembly perspective view.
Figure 3:
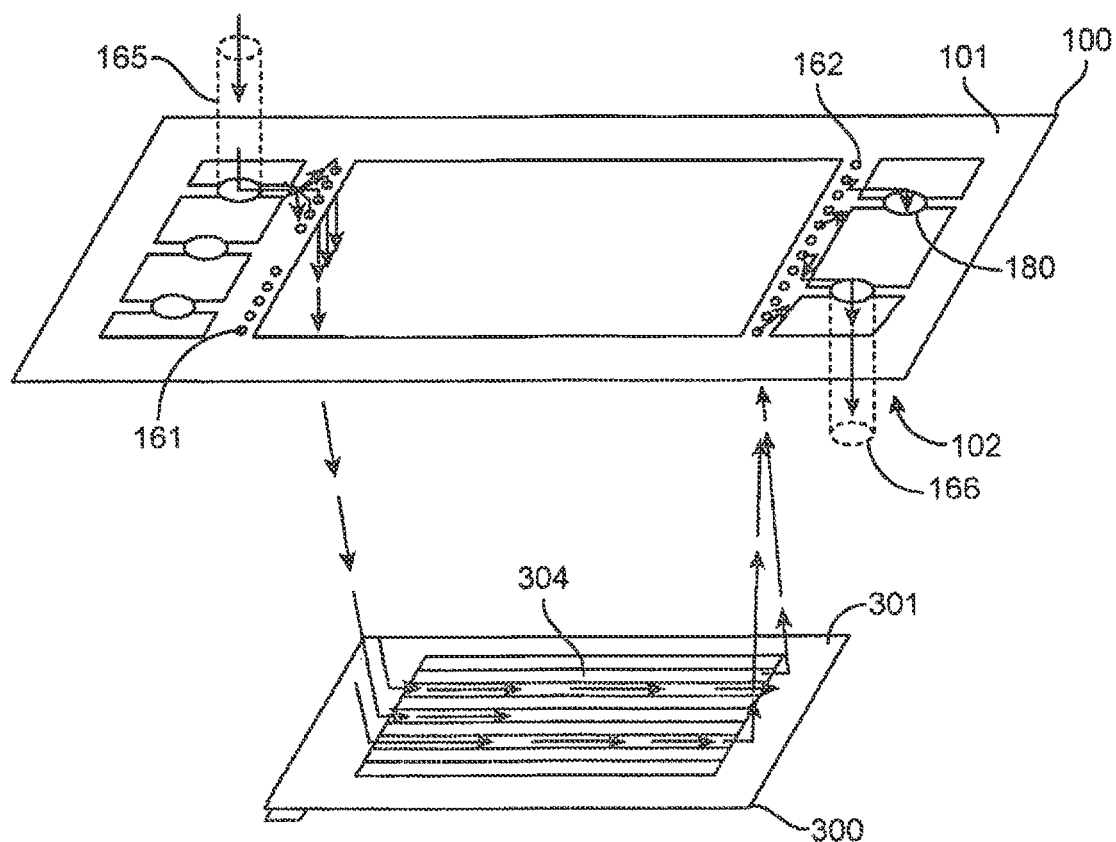
FIG. 3 illustrates aspects of the exemplary flow plate and frame assembly shown in FIG. 1 and schematically depicts anode fluid flow paths through the assembly.

In one aspect, the present disclosure provides anode frame members and cathode frame members than can be utilized for alignment, retention, and fluid flow delivery for bipolar fluid flow plates for use in electrochemical fuel cells. As schematically depicted in FIGS. 1-2, a flow plate and frame assembly can be formed from an anode frame member 100, a cathode frame member 200, and a flow plate 300. A plurality of flow plate and frame assemblies can be stacked together to form a fuel cell stack assembly. The anode frame member 100 has an outer surface 101 and an inner surface 102. The cathode frame member has an outer surface 202 and an inner surface 201. The cathode member and anode frame member engage with each other along their respective inner surfaces 102/201, and retain and surround the flow plate 300 in between the two inner surfaces. A flow field portion of the flow plate 300 is exposed through frame member openings 103 and 203, of the anode and cathode frame members, respectively. The flow field portion of the flow plate 300 is defined by an anode flow field on an anode surface 301 of the flow plate 300 and by a cathode flow field on a cathode surface 302 of the flow plate 300.

In some implementations of the flow plates, the anode and cathode flow fields of the flow plates 300 can include surface features on one or more of the anode surface 301 and cathode surface 302. In some implementations, anode flow channels 304 on an anode surface 301 of the flow plate 300 and by cathode flow channels 305 on a cathode surface 302 of the flow plate 300 may be used to evenly distribute the fluids across the flow field area. The anode flow channels 304 and cathode flow channels 305 can be formed by a plurality of corrugations in the material of the flow plate 300, which can be added by stamping or pressing the flow plate 300 from a sheet stock material. In other implementations distributions of fluids within the anode flow field, cathode flow field, or both may be realized without the use of flow channels. Various aspects of these other implementations are described in commonly-owned Patent Application WO 2005/099008, the entirety of which is incorporated herein for all purposes.

Figure 16:
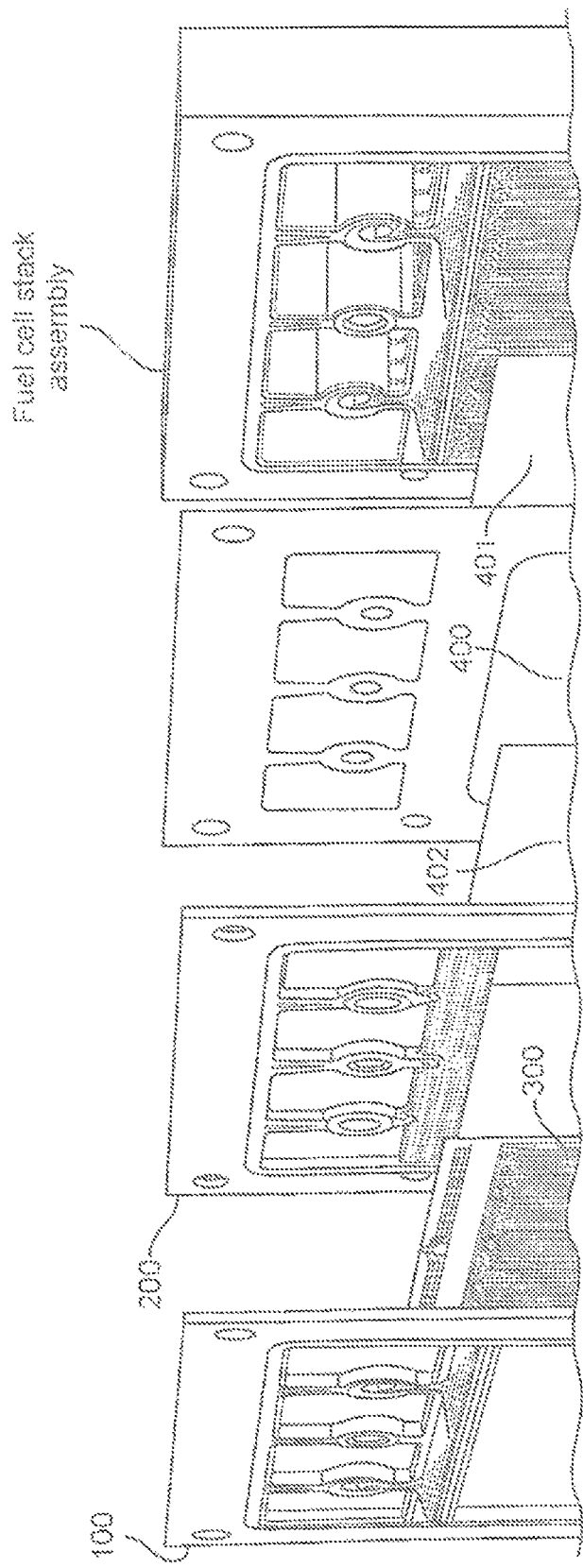
FIG. 16 shows an exploded perspective view of a fuel cell stack assembly and a flow plate and frame assembly.

Electrode membranes 400 (not shown) can be disposed between adjacent flow plates 300. Membranes 400 may be provided with one or more anode gas diffusion layers 401, one or more cathode gas diffusion layers 402, or both (not shown in FIGS. 1 and 2). FIG. 16 depicts an exploded assembly view of a flow plate and frame assembly formed from an anode frame member 100, a flow plate 300, a cathode frame member 200, a cathode gas diffusion layer 402, a membrane electrode assembly 400, and an anode gas diffusion layer 401. Also shown in the right side of FIG. 16 is a perspective view of a fuel cell stack assembly consisting of four of the flow plate and frame assemblies shown in exploded assembly view as they would be disposed together in a compressed stack.

In some exemplary implementations, anode frame member can be provided with fluid manifold regions that provide for anode fluid inlets, cathode fluid inlets, coolant fluid inlets, cathode exhaust outlets, and anode exhaust outlets. In the implementations shown in FIGS. 1-13, the frame members have anode fluid inlets 160/260, coolant fluid inlets 170/270, and cathode fluid inlets 150/250, anode exhaust outlets 180/280, and cathode exhaust outlets 190/290. When a plurality of flow plate and frame assemblies are combined into a fuel cell stack assembly, along with intervening membrane electrode assemblies, fluid entry and exit conduits are formed from the arrays of adjacent inlets and outlets. Anode fluid entry conduit 165 is formed from the array of adjacent anode fluid inlets 160/260 that form a column normal to the surfaces 101/102/201/202 of the frame members. Cathode fluid entry conduit 255 is formed from the array of adjacent cathode fluid inlets 150/250 that form a column normal to the surfaces 101/102/201/202 of the frame members. Coolant fluid entry conduit 275 is formed from the array of adjacent coolant fluid inlets 170/270 that form a column normal to the surfaces 101/102/201/202 of the frame members. Anode fluid exit conduit 166 is formed from the array of adjacent anode exhaust outlets 180/280 that form a column normal to the surfaces 101/102/201/202 of the frame members. Cathode fluid exit conduit 256 is formed from the array of adjacent cathode exhaust outlets 190/290 that form a column normal to the surfaces 101/102/201/202 of the frame members.

Figure 13:
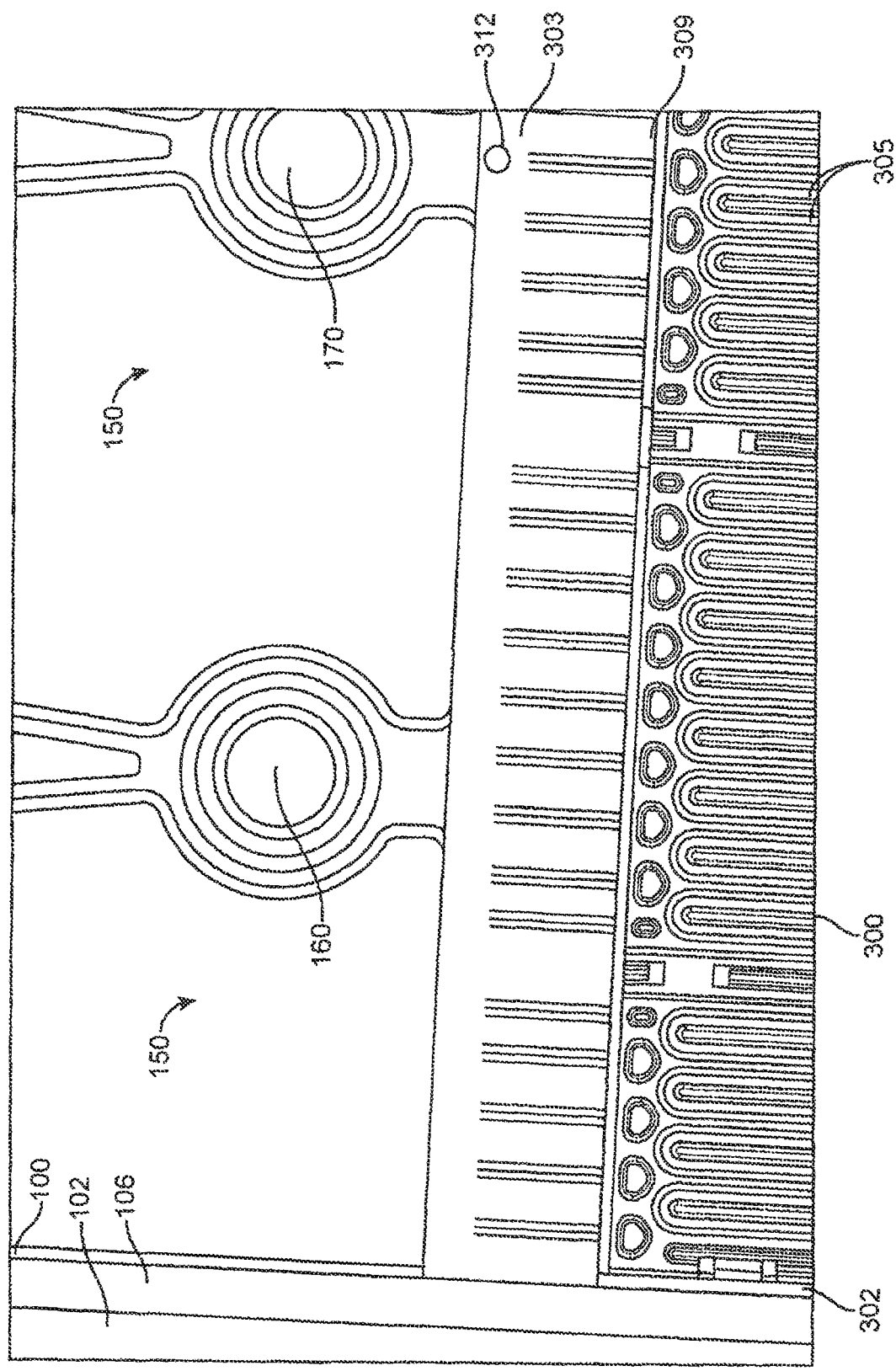
FIG. 13 shows the view of FIG. 12 with a fluid flow plate added in assembled position.
Figure 14:
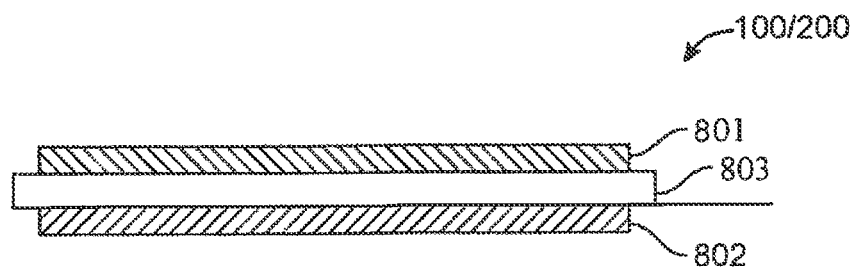
FIG. 14 shows aspects of the anode and cathode frame members in a schematic side view.
Figure 15:
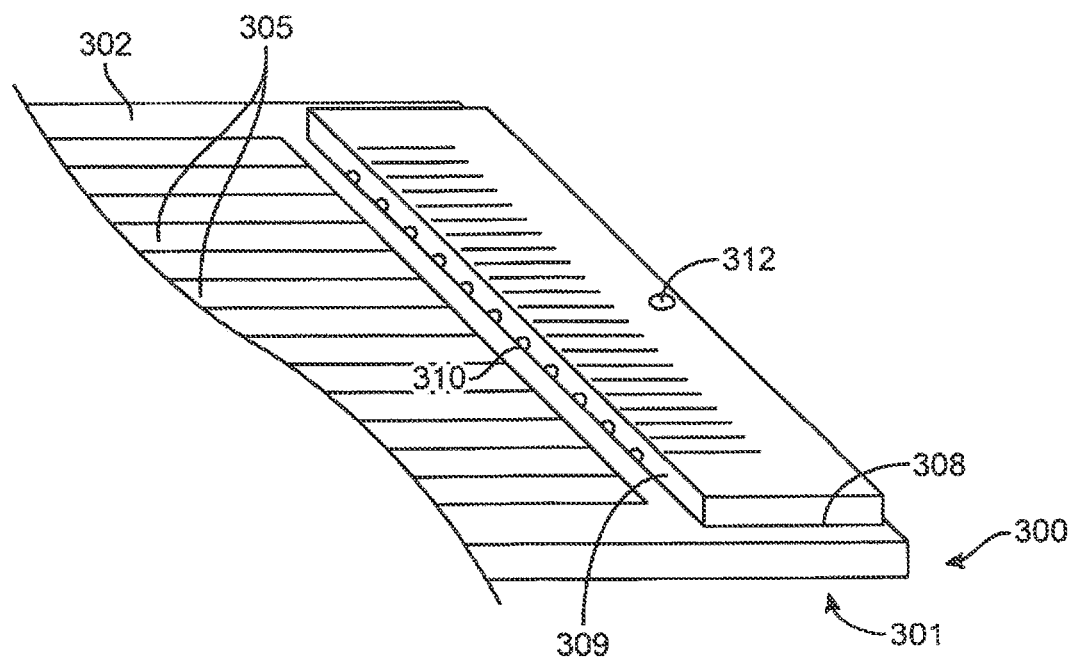
FIG. 15 shows aspects of the fluid flow plate in a schematic perspective view.

In exemplary implementations, flow plate 300 is provided with an integral coolant flowpath volume formed by a folded-over bipolar plate edge. As seen in FIGS. 2, 13, and 15, which schematically depict elements of the flow plate 300, a portion 303 of the flow plate 300 can be folded over the cathode surface 302 of the flow plate 300. Two open peripheral edges 308 are formed, which can be sealed by the use of gaskets, welding, overmolding, adhesives, crimping, folding, or mechanical labyrinth sealing. Such sealing techniques, suitable structures for the flow plates 300, and folded-over plate edge formation of integral coolant flowpath volumes are more fully described in International Patent Application No. PCT/GB2007/001573, published as International Publication No. WO 2007/129030 A1, International Patent Application No. PCT/GB2013/050634, published as International Publication No. WO 2013/140135 A2, International Patent Application No. PCT/GB2015/054020, published as International Publication No. WO 2016/097716 A1, and co-pending application entitled "PRESSED BIPOLAR PLATE HAVING INTEGRATED WATER FLOWPATH VOLUME" filed contemporaneously with this application by the applicant, the entireties of which are incorporated herein for all purposes. An open coolant fluid delivery edge 309 remains which can provide for coolant fluid flow onto the cathode flow channels 305. In some implementations, coolant flowpath conduits 310 can be provided as features in the portion 303 to provide for distinct coolant flow paths along open coolant fluid delivery edge 309. A coolant flowpath volume entry conduit 312 can be provided in the portion 303 that is configured to fluidly connect with a coolant manifold hole 272 formed in cathode plate 200 inner surface 201. Coolant flowpath volume entry conduit 312 fluidly connects with the coolant flowpath volume formed within the fold-over, within which the coolant is distributed across the width of the flow field in order to distribute the coolant fluid evenly across the cathode flow channels 305.

In exemplary implementations, the anode frame member 100 and cathode frame member 200 provide for fluid manifolds to deliver anode fluid, cathode fluid, and coolant fluid to desired locations on the surfaces 301/302 of the flow plate 300. An exemplary anode fluid delivery pathway is depicted schematically in FIGS. 3, 8, and 10-12. Anode fluid is provided to anode frame member 100 via one or more anode fluid entry conduits 165 which fluidly connect with one or more respective anode fluid inlets 160. The illustrative embodiments shown in the Figures depict two anode fluid inlets, but in some implementations one anode fluid inlet or three or more anode fluid inlets may be used. Anode fluid flows across a portion of outer surface 101 of the anode frame member, guided by anode fluid flow region 800 defined by a stepped down edge 805 and fluid distributing protrusions 810. The anode fluid flow region 800 directs the incoming anode fluid across the outer surface 101 to anode fluid conduits 161, which pass the anode fluid through anode frame member 100 to the inner surface 102. As can be seen in part in FIG. 11, upon passing through the anode fluid conduits 161, the anode fluid contacts anode surface 301 of the flow plate 300 and is directed to flow into the anode flow channels 304, across the flow field region and to the opposing edge of the flow plate 300. Upon reaching the opposite edge of the flow field region—the ends of the anode flow channels 304—the anode fluid is passed though anode fluid exhaust conduits 162 to pass through anode frame member 100 from the inner surface 102 to the outer surface 101. On the outer surface 101, an anode exhaust fluid flow region 820 (not depicted in the Figures) directs the anode fluid toward anode exhaust outlets 180 where the anode fluid enters the anode fluid exit conduits 166 to flow out of the stack assembly.

Figure 4:
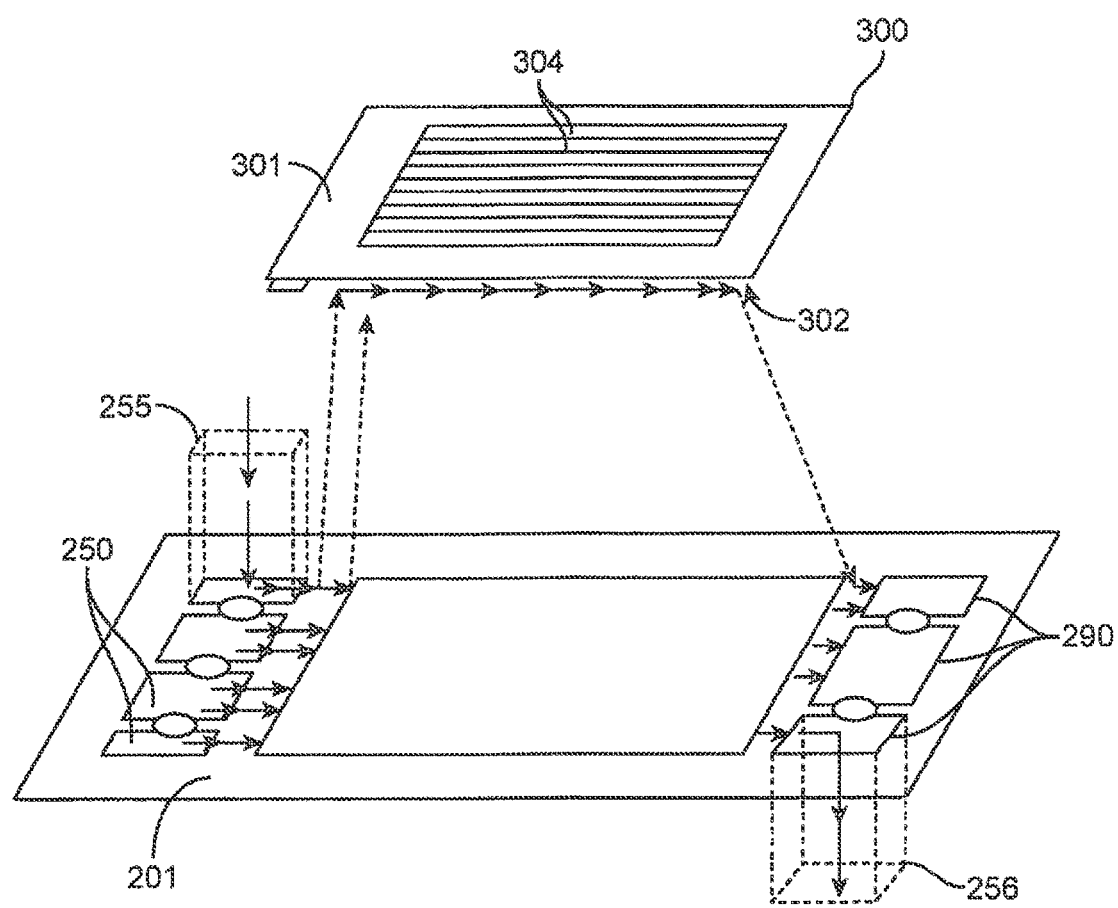
FIG. 4 illustrates aspects of the exemplary flow plate and frame assembly shown in FIG. 1 and schematically depicts cathode fluid flow paths through the assembly.

An exemplary cathode fluid delivery pathway is depicted schematically in FIG. 4. Cathode fluid is provided to cathode frame member 200 via one or more cathode fluid entry conduits 255 which fluidly connect with one or more respective cathode fluid inlets 250. The illustrative embodiments shown in the Figures depict four cathode fluid inlets 250, but in some implementations fewer or more cathode fluid inlets may be used. Cathode fluid can flow across inner surface 201 of the cathode frame member 200 across the portion disposed between the cathode fluid inlets 250 and the cathode frame member opening 203. The cathode fluid flows between inner surface 201 and cathode surface 302 of the flow plate 300 toward and into the cathode flow channels 305. The cathode fluid then flows through the cathode flow channels 305 to the opposing end of the flow plate 300, where it can flow across inner surface 201 of the cathode frame member 200 across the portion disposed between the cathode frame member opening 203 and the cathode exhaust outlets 290. The portion of inner surface 201 across which the cathode fluid flows can be provided with fluid distribution features such as protrusions, castellated channels, or walls that guide the cathode fluid to the cathode exhaust outlets. The cathode exhaust fluid then flows through one or more cathode exhaust outlets 290 and into one or more cathode fluid exit conduits 256.

Figure 5:
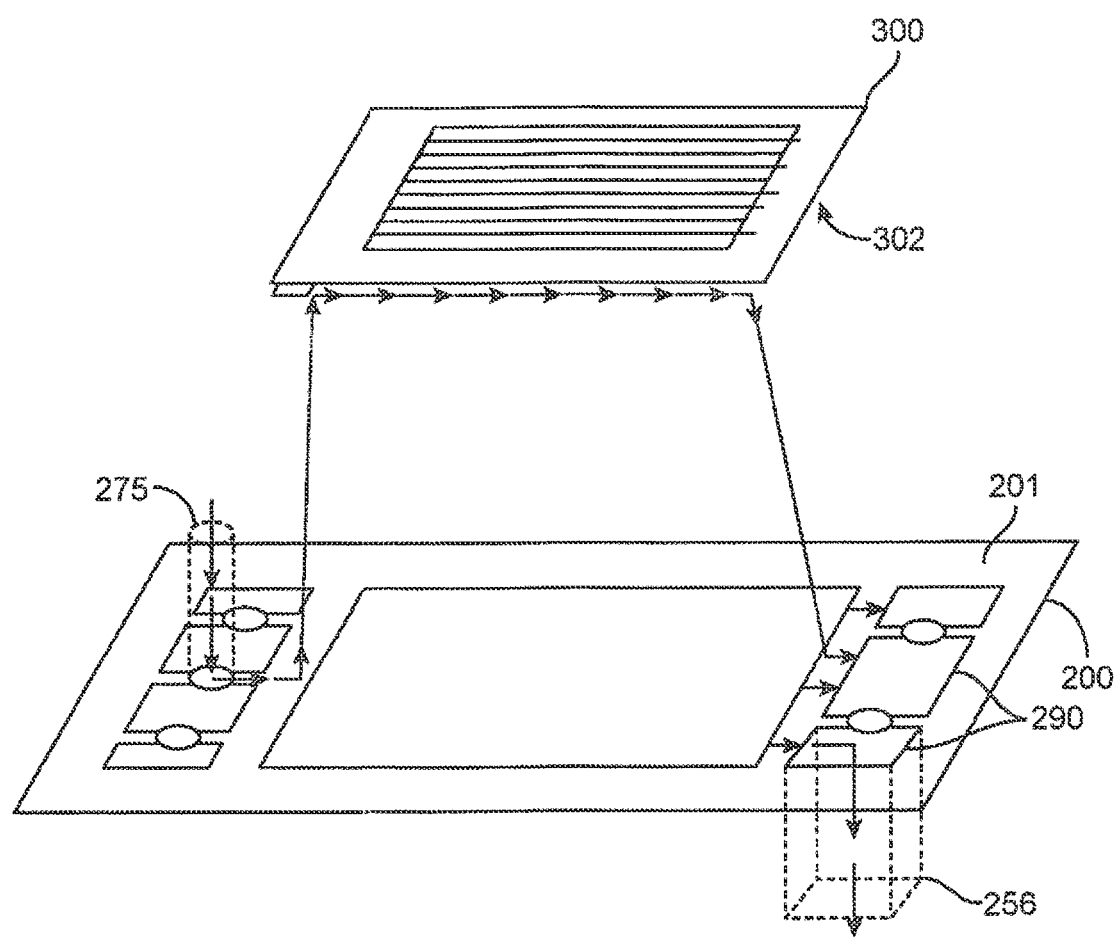
FIGS. 5-6 illustrate aspects of the exemplary flow plate and frame assembly shown in FIG. 1 and schematically depict coolant fluid flow paths through the assembly.
Figure 6:
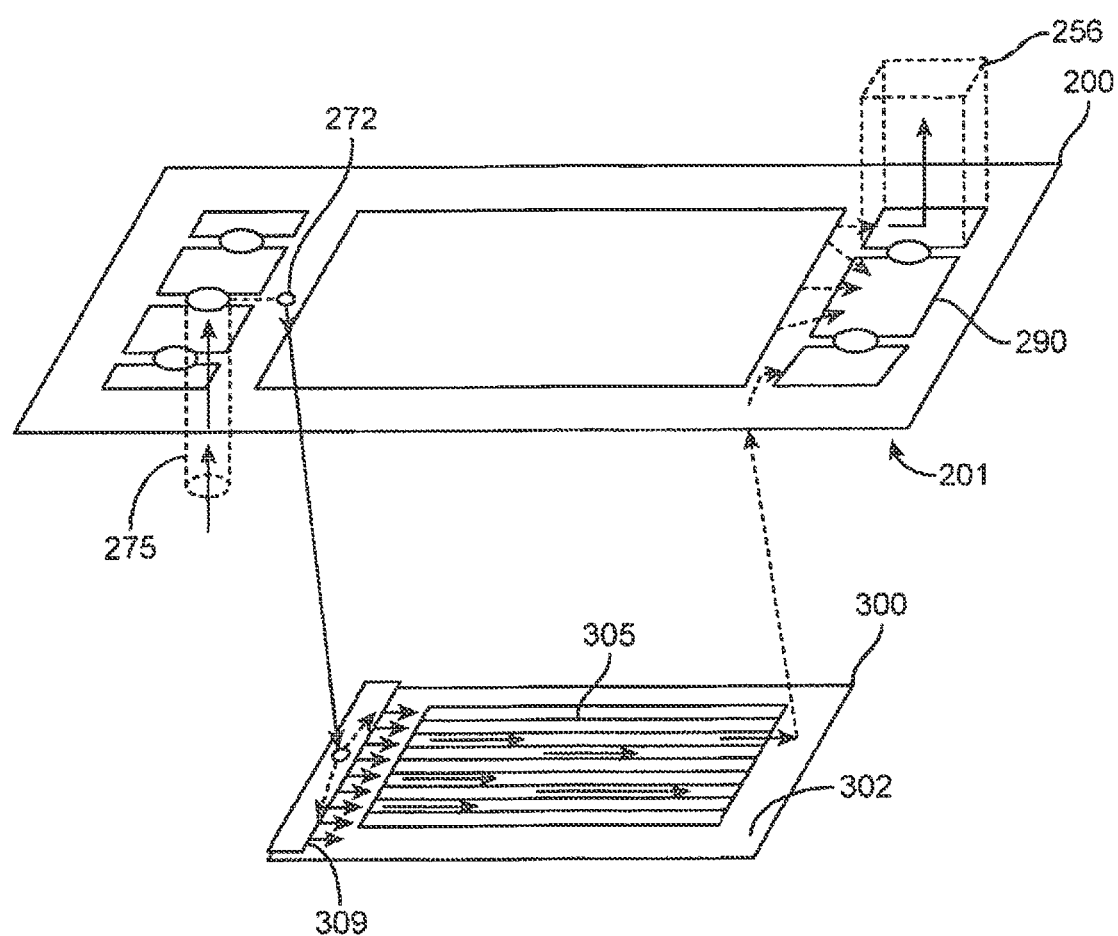

An exemplary coolant fluid delivery pathway is depicted schematically in FIGS. 5 and 6. Coolant fluid is provided to coolant frame member 200 via one or more coolant fluid entry conduits 275 which fluidly connect with one or more respective coolant fluid inlets 270. Coolant fluid inlet 270 is fluidly connected to coolant fluid flow region 830 (not shown) defined by a stepped down edge 805 (not shown). The coolant fluid flow region 830 directs the incoming coolant fluid across the cathode plate 200 inner surface 201 to coolant manifold hole 272, which fluidly connects with the coolant flowpath volume entry conduit 312, which fluidly connects with the coolant flowpath volume formed within the fold-over of flow plate 300, within which the coolant is distributed across the width of the flow field in order to distribute the coolant fluid evenly across the cathode flow channels 305. The coolant fluid is distributed to the open coolant fluid delivery edge 309 and flows into the cathode flow channels 305. In some implementations, coolant flowpath conduits 310 can be provided as features in the portion 303 to provide for distinct coolant flow paths along open coolant fluid delivery edge 309. Coolant fluid mixes with cathode fluid in the cathode flow channels 305 and joins the flow of cathode exhaust fluid described above, which flows across the inner surface 201 of cathode frame member 200 to one or more cathode exhaust outlets 290 and into one or more cathode fluid exit conduits 256.

Figure 7:
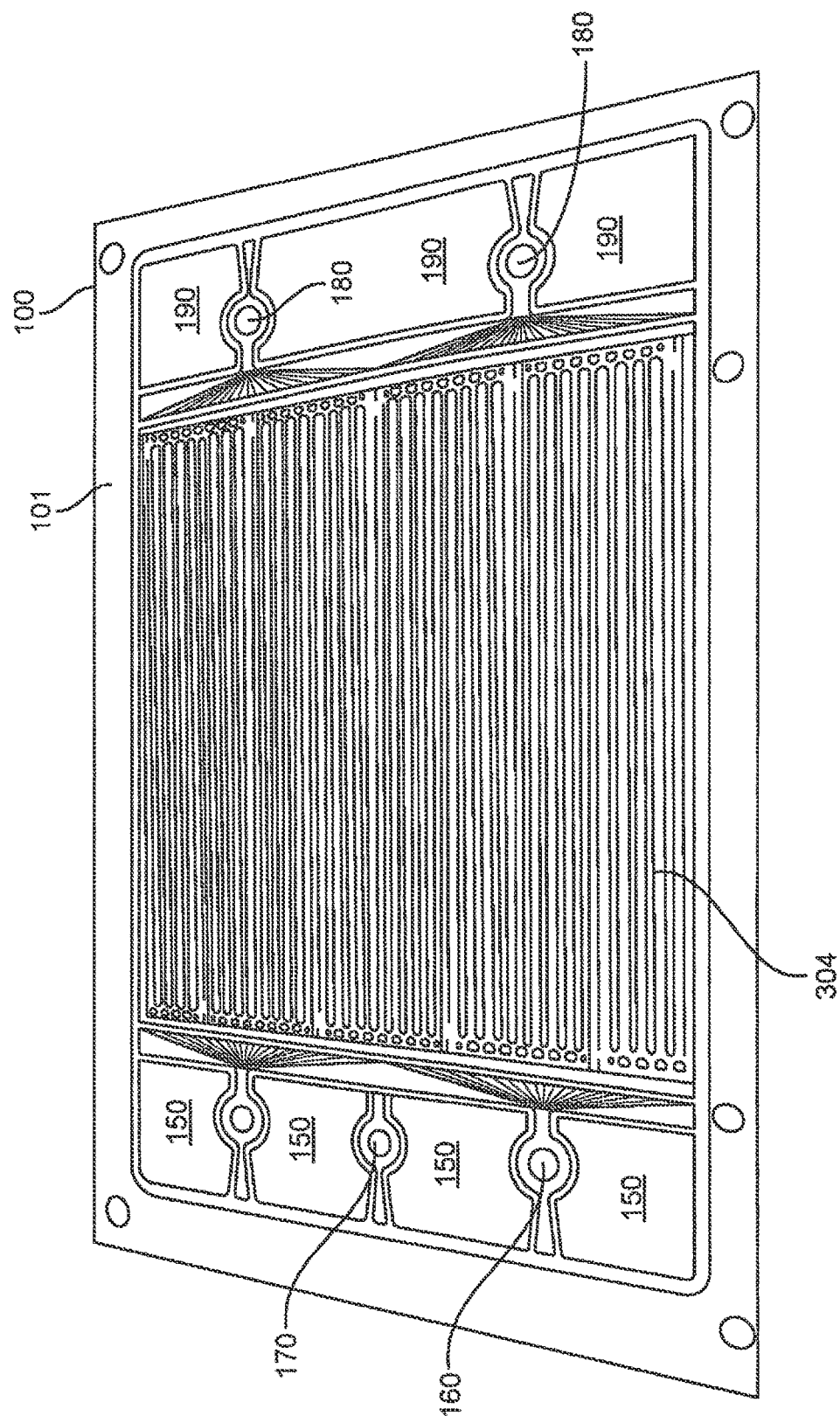
FIG. 7 illustrates aspects of the exemplary flow plate and frame assembly shown in FIG. 1 in a perspective view.
Figure 8:
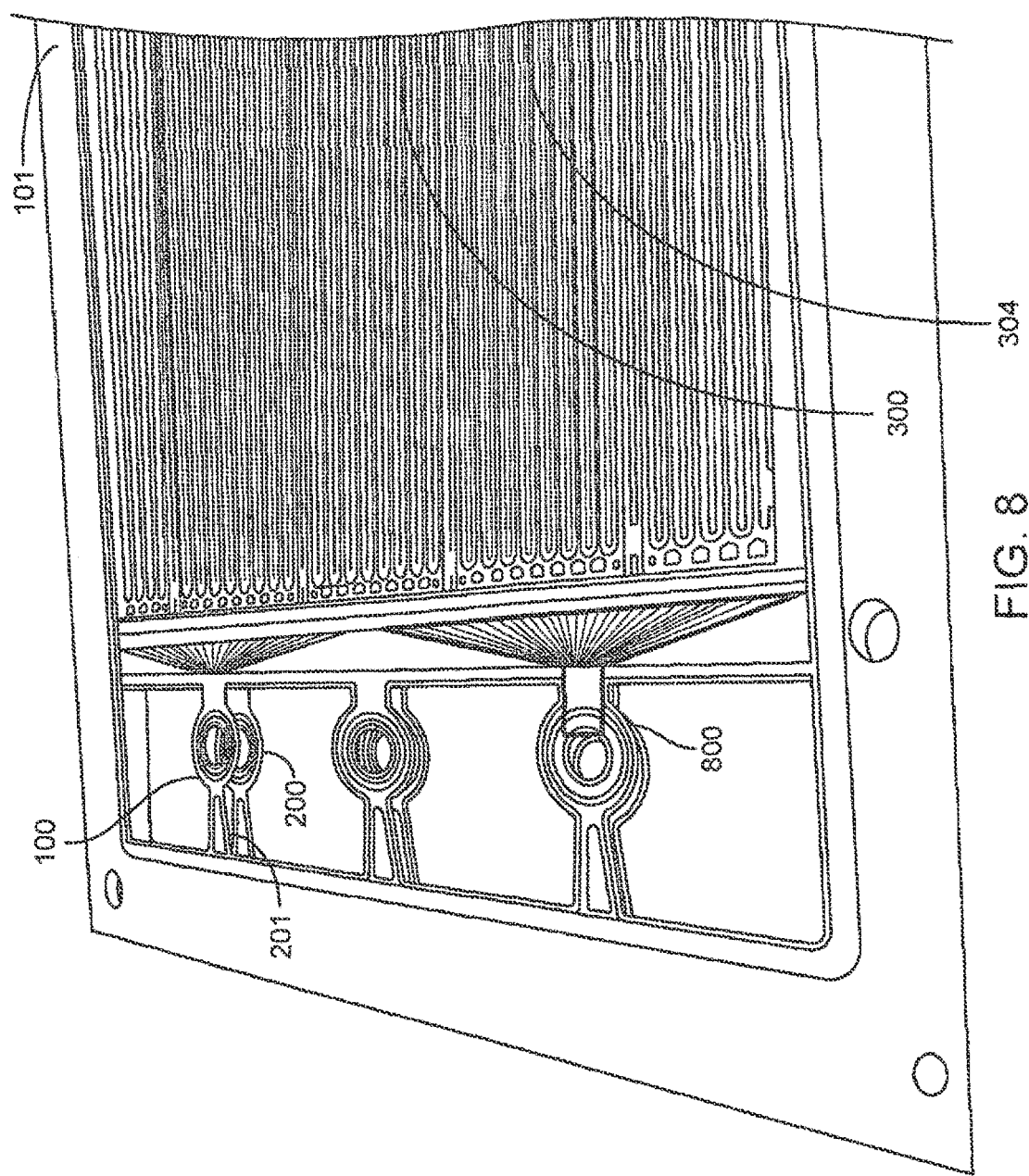
FIG. 8 illustrates aspects of the exemplary flow plate and frame assembly shown in FIG. 7 in a perspective view with some separation between components for illustrative purposes.
Figure 9:
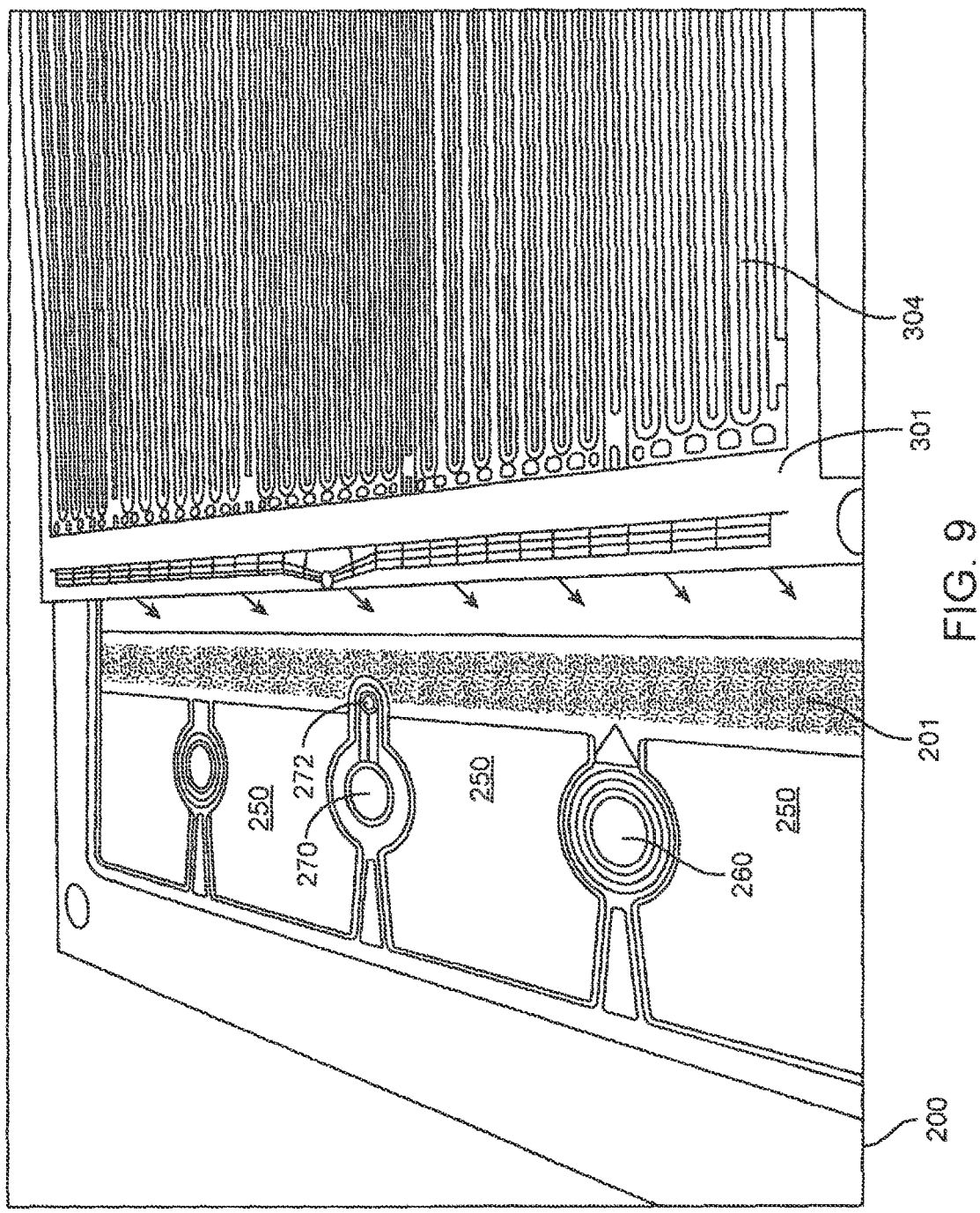
FIG. 9 shows aspects of the exemplary flow plate and frame assembly shown in FIG. 7 in a perspective view with the anode frame member removed and the fluid flow plate displaced for illustrative purposes.
Figure 10:
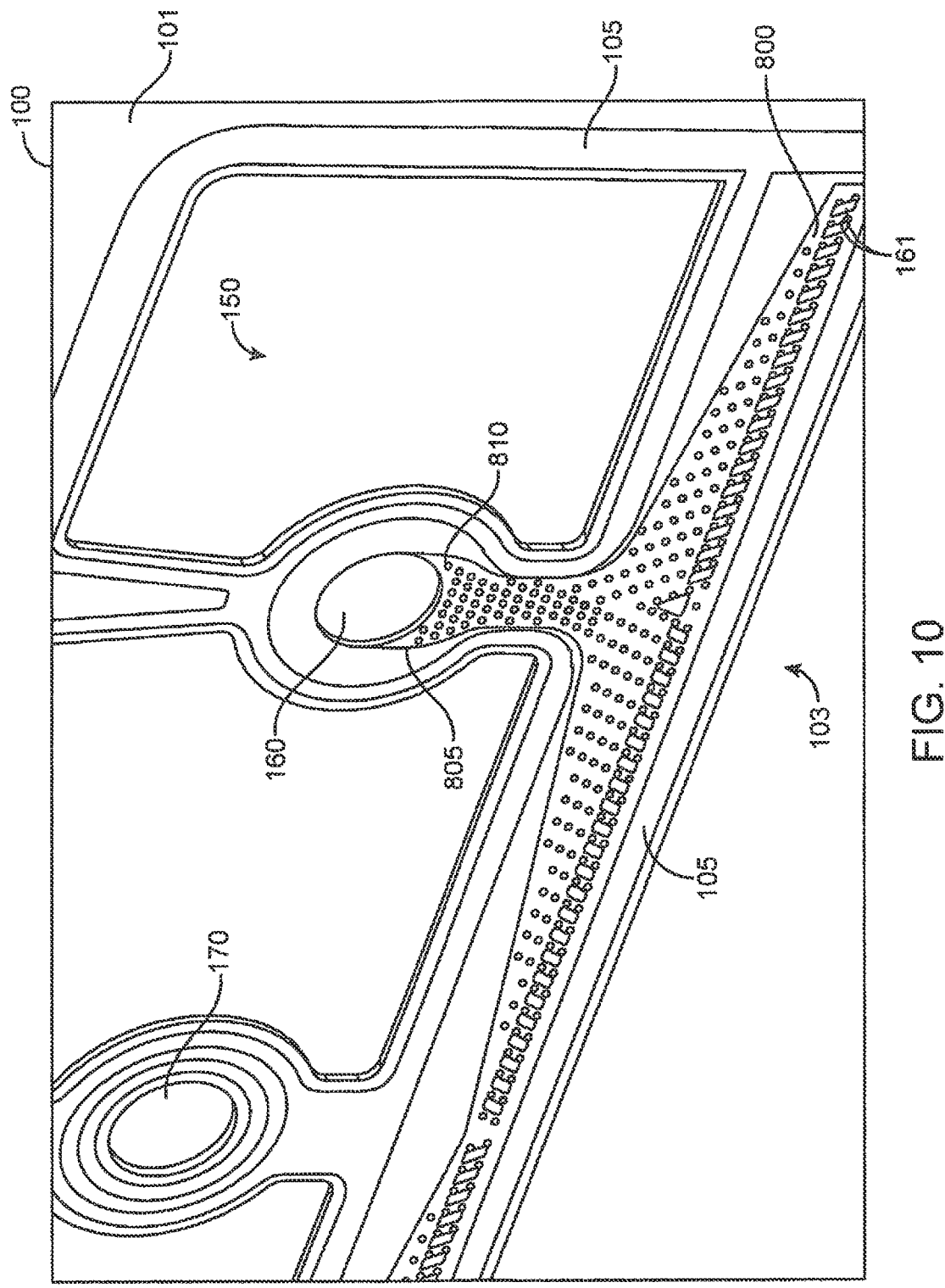
FIG. 10 shows a view of the outer face of the anode frame member to illustrate aspects of the exemplary flow plate and frame assembly shown in FIG. 7.
Figure 11:
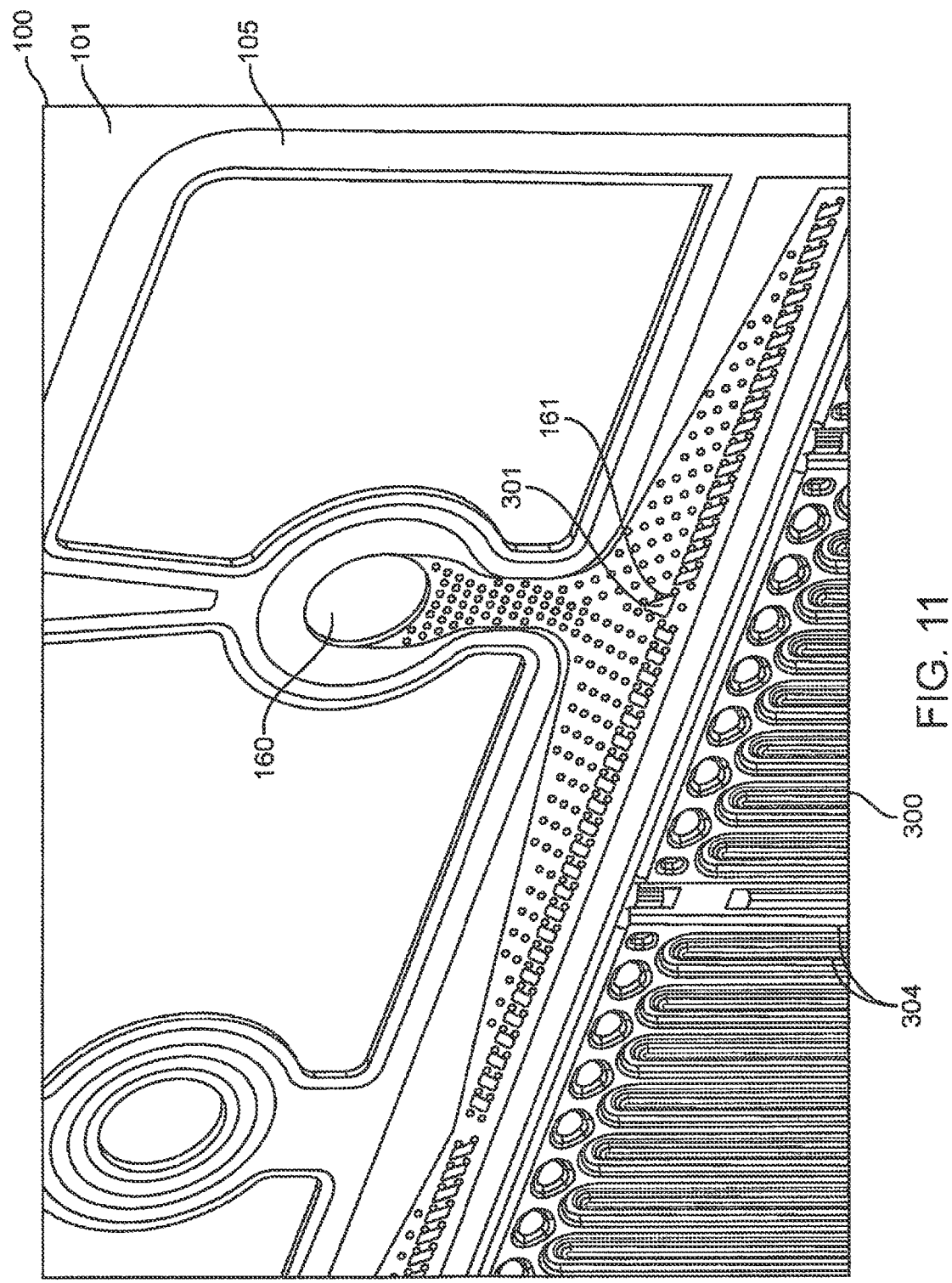
FIG. 11 shows the view of FIG. 10 with a fluid flow plate added in assembled position.
Figure 12:
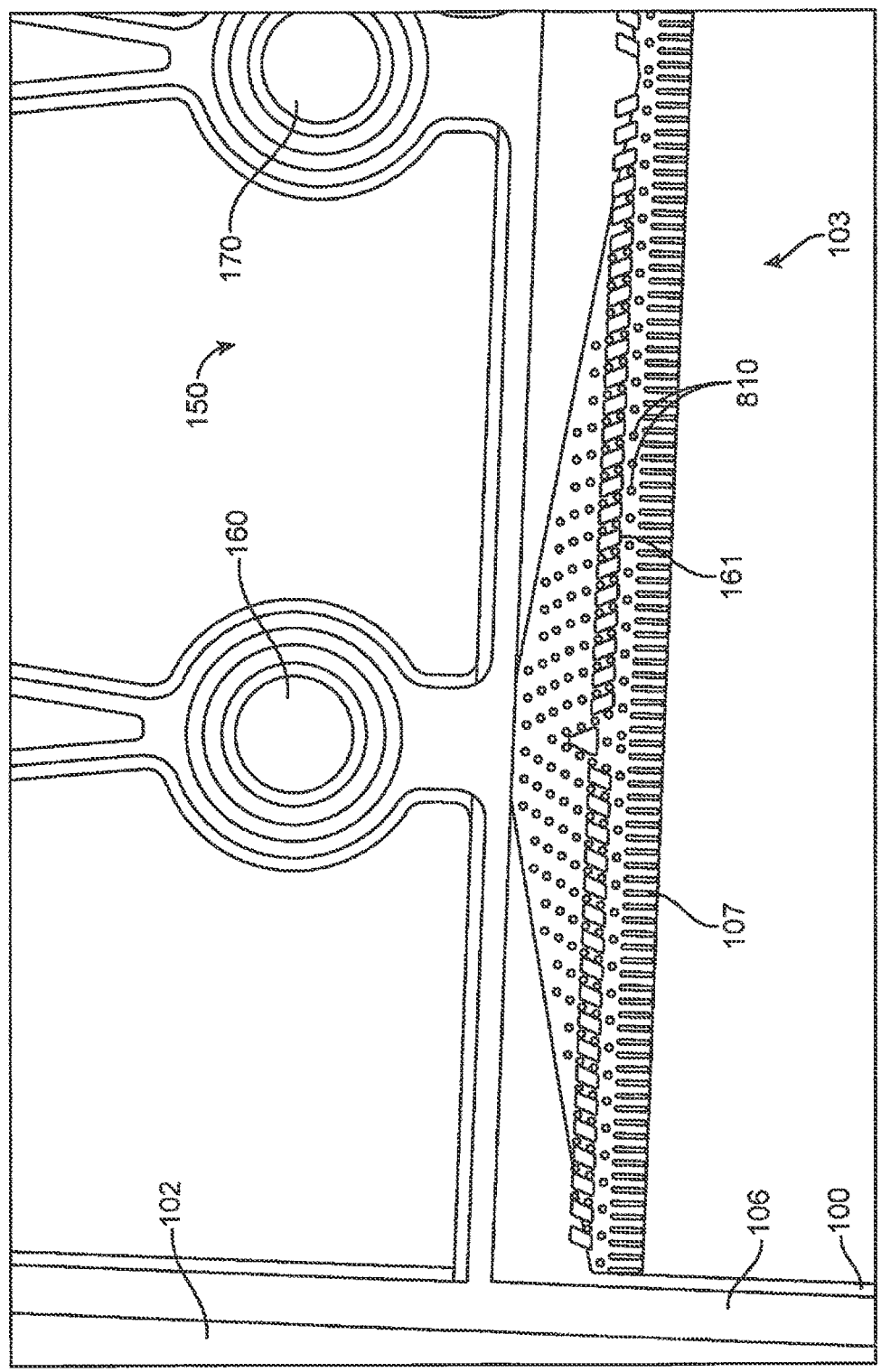
FIG. 12 shows a view of the inner face of the anode frame member shown in FIG. 10.

FIGS. 7-15 illustrate aspects of an exemplary flow plate and frame assembly formed from anode frame member 100, cathode frame member 200, and flow plate 300. FIG. 7 shows an assembly and shows the outer surface 101 of anode frame member 100, with the anode surface 301 of the flow plate 300 visible through the anode frame member opening 103. The outer periphery edges of the anode surface 301 are retained by the inner surface 102 of the anode frame member around the periphery edges of the anode frame member opening 103. FIG. 8 shows the same assembly as FIG. 7, but with the frame members 100 and 200 separated to show their engagement. FIG. 9 shows the inner surface 201 of a cathode frame member 200 with a flow plate 300 in the process of being positioned on the cathode frame member 200. FIG. 10 shows a view of a portion of the outer surface 101 of the anode frame member 100 to illustrate aspects of the exemplary flow plate and frame assembly shown in FIG. 7. The anode fluid flow region 800 can be seen defined by a stepped down edge 805 and fluid distributing protrusions 810. Protrusions 810 allow for free flow of the anode fluid, while providing for fluid distribution and support against potential deformation due to compression force which is applied normal to the anode outer surface 101 when the fuel cell stack assembly is formed. Stepped down edge 805 can be shaped to guide fluid distribution across the width of the flow field such that anode fluid flows evenly throughout the plurality of anode fluid conduits 161. FIG. 11 shows the same partial view of FIG. 10 with a fluid flow plate added in assembled position, with anode surface 301 abutting against anode fluid conduits 161. FIG. 12 shows a view of the inner face 102 of the anode frame member shown in FIG. 10, and depicts the opposite side of the anode fluid conduits 161. FIG. 13 depicts the same view at FIG. 12, but with the flow plate 300 disposed in assemble position over a portion of the inner surface 102 of the anode frame member 100. The cathode surface 302 of the flow plate 300 is shown, with features of the coolant fluid pathway.

In some implementations, each anode frame member and cathode frame member is formed from two distinct materials. A rigid frame element, made from material 803, is provided with select regions of sealing material 801/802 on the inner and outer surfaces 101/102/201/202. The sealing material 801/802 is a soft material that can be compressed to provide seals around particular features within the flow plate and frame assembly when the components are placed together under compression. The sealing material 801/802 is preferably an elastomeric material, such as TPE-S, TPE-U, TPE-E, TEP-A, TPE-O, EPDM, FKM, polyolefin, neoprenes, nitrile rubbers, or silicones. The rigid frame element material 803 can be a plastic material including but not limited to PA/Nylon, PBT, PEI, PC, PC/ABS or PP, with or without reinforcement fillers such fibres of glass, Kevlar or carbon. The sealing material can be provided in regions 105/106 on the inner and outer surfaces, respectively, of the anode frame element and can be used for peripheral sealing around the edges of the frame members, peripheral sealing around portions of the edges on the cathode and anode surfaces 301/302 of the flow plate 300, and sealing to define the anode, cathode, and coolant flow pathways through the assembly. The materials selected for material 803/801/802 should be selected for compatibility with the operating temperatures of the overall assembly and for chemical compatibility with the fluids with which the materials will contact during operation. In some instances, anode fluid, which may be hydrogen gas, can permeate or leak through the material 803 at an acceptable de minimus flow rate. In some preferred implementations, anode frame member 100, cathode frame member 200, or both can be formed by a 2-shot molding (2K molding) process, which can provide both the hard plastic material 803 and a softer material 801/802 on multiple surfaces of the hard plastic material 803. In other implementations, the material 803 can be formed via an initial process such as injection molding or additive manufacturing techniques, and the softer material 801/802 can be added in a separate step of overmolding. In yet other implementations elements 801/802 can be provided as separate gaskets cut or molded into the desired shape and then physically oriented into position on the rigid frame element material 803. The 2K molded process can be advantageous in that it reduces the number of total components, eliminates manufacturing steps, and eliminates alignment steps in assembly.

In some aspects, the present disclosure provides for methods of assembling flow plate and frame assemblies. Once assembled a plurality of identical flow plate and frame assemblies can be stacked together into an aligned fuel cell stack assembly and placed under compression. In exemplary implementations, methods of assembling a flow plate and frame assembly can include the steps of forming an anode frame member 100, forming a cathode frame member 200, forming a flow plate 300, disposing the flow plate 300 onto the cathode frame member 200 with the cathode surface 302 in contact with the inner surface 201, disposing the anode frame member 100 onto the flow plate 300 and cathode frame member 200 with the inner surface 102 in contact with the inner surface 201 and anode surface 301. In some implementations, the forming of the cathode frame member 200 and anode frame member 100 can be done via 2K molding processes. The methods can further include a step of aligning the fluid inlets and outlets of the anode frame member 100 and cathode frame member 200. The methods can include a further step of retaining the anode frame member 100 and cathode frame member 200 together. The retaining of the frame members 100/200 together can be done with a temporary clipping or retaining element that is removed during assembly of an aligned fuel cell stack assembly, as final compression loading of the stack assembly is sufficient to ensure sealing integrity throughout the stack assembly between adjacent frame members. Methods of assembling an aligned fuel stack assembly can include the steps of obtaining a plurality of identical flow plate and frame assemblies, stacking the plurality of identical flow plate and frame assemblies together into a stack with the outer surfaces 101/202 of adjacent flow plate and frame assemblies engaging together to form seals.

In some implementations, the fuel stack assemblies described herein may be used in an evaporatively cooled fuel cell operation. Methods of operating EC fuel cells are described more fully in U.S. Patent Pre-Grant Publication US2015/0236361A1, entitled "Coolant fluid feed to fuel cell stacks, and International Patent Publication WO2016/034853A1, entitled "Fuel cell system," and International Patent Publication WO2015/140529A1, entitled "Fuel cell stack," the entireties of which are incorporated herein for all purposes. The fuel cell stack assembly can be provided with cathode fluid, anode fluid, and coolant fluid inputs via a flow control assembly that provides the desired flow rates for each fluid for optimal operation. Exhaust fluid flows can be collected from the outlet manifolding via anode fluid exit conduit 166 and cathode fluid exit conduit 256, and water content in the exhaust flows can be captured and reused in further operation for cooling or hydrating the stack.

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and sub-combinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true spirit and scope of the disclosure.

The invention claimed is:

1. A flow plate and frame assembly comprising:
an anode frame member (100) comprising an outer surface (101), an inner surface (102), and an anode frame opening (103);
a cathode frame member (200) comprising an outer surface (202), an inner surface (201), and a cathode frame opening (203);
and a flow plate (300) comprising an anode surface (301) and a cathode surface (302);
wherein the cathode frame member (200) and anode frame member (100) engage with each other along their respective inner surfaces (102/201), and retain and surround an entire perimeter of the flow plate (300) in between the inner surfaces (102/201) with a portion of the anode surface (301) in contact with the anode frame member inner surface (102) and a portion of the cathode surface (302) in contact with the cathode frame member inner surface (201);
wherein the anode frame member (100), cathode frame member (200), and flow plate (300) are configured to provide a fluidly connected anode fluid pathway;
the anode fluid pathway comprises one or more anode fluid inlets 160, a portion of the outer surface (101) defined by an anode fluid flow region (800), one or more anode fluid conduits (161) pass through the anode frame member (100) and connect outer surface (101) to inner surface (102), a volume between the anode frame member (100) inner surface (102) and flow plate (300) anode surface (301), and one or more anode flow channels (304); and,
configured below a stepped down edge (805) an anode fluid inlet (160) is fluidly connected to the anode fluid flow region and fluid distributing protrusions (810).

2. The flow plate and frame assembly of claim 1, wherein the anode surface (301) comprises a plurality of anode flow channels (304) and the cathode surface (302) comprises a plurality of cathode flow channels (305).

3. The flow plate and frame assembly of claim 1, wherein:
the anode frame member (100) comprises one or more anode fluid inlets (160), one or more coolant fluid inlets (170), one or more cathode fluid inlets (150), one or more anode exhaust outlets (180), and one or more cathode exhaust outlets (190);
the cathode frame member (200) comprises one or more anode fluid inlets (260), one or more coolant fluid inlets (270), one or more cathode fluid inlets (250), one or more anode exhaust outlets (280), and one or more cathode exhaust outlets (290);
each anode fluid inlet, coolant fluid inlet, cathode fluid inlet, anode exhaust outlet, and cathode exhaust outlet in the anode frame member is aligned with a corresponding anode fluid inlet, coolant fluid inlet, cathode fluid inlet, anode exhaust outlet, and cathode exhaust outlet in the cathode frame member.

4. The flow plate and frame assembly of claim 1, wherein:
the flow plate (300) comprises an integral coolant flowpath volume formed by a folded-over edge of the flow plate, with a portion (303) of the flow plate (300) folded over the cathode surface (302) of the flow plate (300);
the flow plate further comprises an open coolant fluid delivery edge (309) configured to provide for coolant fluid flow out of the integral coolant flowpath volume and onto the cathode surface (302).

5. The flow plate and frame assembly of claim 4, wherein:
the anode frame member (100), cathode frame member (200), and flow plate (300) are configured to provide a fluidly connected cathode fluid pathway;
the cathode fluid pathway comprises one or more cathode fluid inlets 250, a first portion of the inner surface (201) of the cathode frame member (200), a volume between inner surface (201) and cathode surface (302) of the flow plate (300), and one or more cathode flow channels (305); and
the first portion is disposed between the cathode fluid inlets (250) and the cathode frame member opening (203).

6. The flow plate and frame assembly of claim 4, wherein:
the anode frame member (100), cathode frame member (200), and flow plate (300) are configured to provide a fluidly connected coolant fluid pathway;
the coolant fluid pathway comprises one or more coolant fluid inlets (270), a coolant fluid flow region (830), a portion of the cathode plate (200) inner surface (201), a coolant manifold hole (272), a coolant flowpath volume entry conduit (312) formed in portion (303), the integral coolant flowpath volume, open coolant fluid delivery edge (309), and one or more cathode flow channels (305); and
the coolant fluid flow region is defined by a stepped down edge 805.

7. The flow plate and frame assembly of claim 1, wherein:
the anode frame member, the cathode frame member, or both comprise two distinct materials.

8. The flow plate and frame assembly of claim 7, wherein:
the two distinct materials comprise a rigid frame element made from a hard plastic material (803) and select regions of a compressible sealing material (801/802).

9. The flow plate and frame assembly of claim 7, wherein the anode frame member, cathode frame member, or both are formed via a 2K molding process.

10. The flow plate and frame assembly of claim 1, further comprising a membrane electrode assembly.

11. A fuel cell stack assembly comprising a plurality of identical flow plate and frame assemblies of any one of the preceding claims, with each identical flow plate and frame assembly aligned with the outer surfaces 101/202 of adjacent flow plate and frame assemblies engaging together.

12. The fuel cell stack assembly of claim 11, wherein:
one or more anode fluid entry conduits (165) are formed from arrays of adjacent anode fluid inlets (160/260) that form a column normal to the surfaces (101/102/201/202) of the frame members;
one or more cathode fluid entry conduits (255) are formed from arrays of adjacent cathode fluid inlets (150/250) that form a column normal to the surfaces (101/102/201/202) of the frame members;
one or more coolant fluid entry conduits (275) are formed from arrays of adjacent coolant fluid inlets (170/270) that form a column normal to the surfaces (101/102/201/202) of the frame members;
one or more anode fluid exit conduits (166) are formed from arrays of adjacent anode exhaust outlets (180/280) that form a column normal to the surfaces (101/102/201/202) of the frame members; and
one or more cathode fluid exit conduits (256) are formed from arrays of adjacent cathode exhaust outlets 190/290 that form a column normal to the surfaces (101/102/201/202) of the frame members.

13. A fuel cell system comprising the fuel cell stack assembly of claim 11.

* * * * *